US009475062B2

(12) United States Patent
Sazawa

(10) Patent No.: US 9,475,062 B2
(45) Date of Patent: Oct. 25, 2016

(54) MAGNETIC INLINE FILTER

(71) Applicant: SHOUNAN ENGINEERING INC., Kagoshima (JP)

(72) Inventor: Masaji Sazawa, Kagoshima (JP)

(73) Assignee: SHOUNAN ENGINEERING INC., Kagoshima (JP)

( * ) Notice: Subject to any disclaimer, the term of this patent is extended or adjusted under 35 U.S.C. 154(b) by 62 days.

(21) Appl. No.: 14/418,447

(22) PCT Filed: Dec. 16, 2013

(86) PCT No.: PCT/JP2013/083644
§ 371 (c)(1),
(2) Date: Jan. 30, 2015

(87) PCT Pub. No.: WO2014/098040
PCT Pub. Date: Jun. 26, 2014

(65) Prior Publication Data
US 2015/0165447 A1 Jun. 18, 2015

(30) Foreign Application Priority Data
Dec. 17, 2012 (JP) .................. 2012-274991

(51) Int. Cl.
B03C 1/12 (2006.01)
B03C 1/28 (2006.01)
(Continued)

(52) U.S. Cl.
CPC .............. *B03C 1/12* (2013.01); *B03C 1/0332* (2013.01); *B03C 1/0335* (2013.01); *B03C 1/286* (2013.01); *B03C 1/288* (2013.01); *B24B 55/03* (2013.01); *C02F 1/481* (2013.01); *C02F 1/488* (2013.01); *B03C 2201/18* (2013.01); *B03C 2201/20* (2013.01); *C02F 2201/002* (2013.01); *C02F 2201/48* (2013.01)

(58) Field of Classification Search
CPC ....... B03C 1/12; B03C 1/286; B03C 1/0332; B03C 1/288; B03C 2201/18; B03C 2201/20; C02F 1/481; C02F 1/488; B24B 55/03
See application file for complete search history.

(56) References Cited

FOREIGN PATENT DOCUMENTS

| CN | 1623670 | 6/2005 |
| JP | 59-024114 | 2/1984 |

(Continued)

OTHER PUBLICATIONS

Translation of the International Preliminary Report on Patentability for PCT/JP2013/083644, dated Jun. 17, 2015.*

(Continued)

*Primary Examiner* — David A Reifsnyder
(74) *Attorney, Agent, or Firm* — Jianq Chyun IP Office

(57) ABSTRACT

A magnetic inline filter is provided. A piston rod of a fluid cylinder is retracted to the top to locate an inner circumferential surface side magnet and an outer circumferential surface side magnet in filtration positions opposed to a space. In this state, a solenoid of a changeover valve is actuated to shut off a discharge port. A coolant is introduced into the space from an introduction port in the vicinity of the lower end of an outer pipe. Since a magnetic field in a radiation direction is intense, chips in the coolant are attracted to wall surfaces on both sides of the space and the coolant is filtrated. When the supply of the coolant is continued, the chips attracted to the wall surfaces are accumulated and bridged. As a result, since the coolant passes through gaps of the bridged chips, it is possible to perform precise filtration.

9 Claims, 16 Drawing Sheets

(51) Int. Cl.
 *B03C 1/033* (2006.01)
 *C02F 1/48* (2006.01)
 *B24B 55/03* (2006.01)

(56) References Cited

FOREIGN PATENT DOCUMENTS

| JP | 59-196765 | 11/1984 |
| JP | 62-149315 | 7/1987 |
| JP | S6234574 | 9/1987 |
| JP | 10-286740 | 10/1998 |
| JP | 2003-094336 | 4/2003 |
| JP | 2006-305417 | 11/2006 |
| JP | 2011-011205 | 1/2011 |

OTHER PUBLICATIONS

"Office Action of China Counterpart Application", issued on Nov. 20, 2015, pp. 1-9, with English translation thereof.
"International Search Report (Form PCT/ISA/210)", mailed on Mar. 18, 2014, with English translation thereof, pp. 1-4.
Office Action of China Counterpart Application, issued on Aug. 3, 2016, p. 1-p. 6.

\* cited by examiner

MAGNETIC INLINE FILTER

CROSS-REFERENCE TO RELATED APPLICATION

This application is a 371 application of an international PCT application serial no. PCT/JP2013/083644, filed on Dec. 16, 2013, which claims the priority benefit of Japan application no. 2012-274991, filed on Dec. 17, 2012. The entirety of each of the above-mentioned patent applications is hereby incorporated by reference herein and made a part of this specification.

TECHNICAL FIELD

The present invention relates to a magnetic inline filter that removes magnetic bodies, which are foreign matters, in waste water with a filter. More particularly, the present invention relates to a magnetic inline filter that, to remove chips in a coolant supplied to a machining section of a machine tool, uses the chips themselves as a filter.

BACKGROUND ART

In a machine tool such as a grinder or a machining center, machining of a workpiece and cleaning of a jig are performed while a coolant is supplied to the workpiece in a machining section and the jig from a coolant tank. Chips of the machined workpiece and chips washed away from the jig are collected in the coolant tank together with the coolant, after large chips are collected by a chip conveyor. The collected coolant is filtrated by a filter disposed halfway in a piping route for supplying the coolant to the machining section and the like. Particulates mixed in the coolant are separated from the coolant and collected.

As the filter, a filtration type filter made of paper or cloth, such as a paper filter or a bag filter, is used. However, clogging easily occurs in the filtration type filter. Therefore, the filtration type filter needs to be periodically cleaned or replaced. Running costs increase and manpower is required for replacement work. In order to solve this problem, magnetic inline filters described in Patent Document 1 and Patent Document 2 are proposed.

In the magnetic inline filter of Patent Document 1, a double pipe is configured by a cylindrical sealed container and a treatment container on the outer side of the sealed container. A plurality of disc-like permanent magnets are stacked and disposed in a cylindrical space in the center of the sealed container. In an annular space between pipes of the double pipe, a number of small ferromagnetic filter members are filled. The filter members are magnetized by the permanent magnets. A coolant is caused to pass through gaps of the magnetized filter members and the filter members are caused to attract chips included in the coolant to separate the chips from the coolant. When the chips attracted by the filter members are accumulated and filtration efficiency falls, the permanent magnets are moved to a position completely off a position opposed to the filter members to demagnetize the filter members. The coolant is reversely fed to discharge the chips attracted by the filter members to the outside.

In the magnetic inline filter of Patent Document 1, since replacement filters are unnecessary, running costs can be reduced. However, since the disc-like permanent magnets are disposed only in the cylindrical space in the center, a magnetic field in a radiation direction is weak, magnetization of the filter members is weak, and there is a problem in filtration ability. In the magnetic inline filter of Patent Document 2, metal particles are filled in a plurality of circulation paths through which a coolant flows. The magnetic inline filter includes magnet housing sections along both the sides of the circulation paths. Permanent magnets are housed in the magnet housing sections. The permanent magnets are enabled to move between a filtration position for magnetizing the metal particles and a cleaning position for separating the permanent magnets from the metal particles to release the metal particles from magnetism.

Also in the magnetic inline filter of Patent Document 2, replacement filters are unnecessary. Therefore, it is possible to reduce running costs. However, since the plurality of circulation paths and the plurality of magnet housing sections are formed narrow and slender, structure is complicated and it is difficult to dispose a number of permanent magnets to intensify a magnetic field.

CITATION LIST

Patent Literature

Patent Document 1: Japanese Patent Application Laid-open No. 2011-11205
Patent Document 2: Japanese Patent Application Laid-open No. 2006-305417

SUMMARY OF THE INVENTION

Technical Problem

It is an object of the present invention to provide a magnetic inline filter in which structure is simple, a magnetic field is intense, a special filter member is unnecessary, and a filtration ability is large.

It is another object of the present invention to provide a magnetic inline filter that bridges chips attracted by a magnet and causes a coolant to pass through gaps of the bridged chips to thereby enable precise filtration.

Solution to Problem

The problems are solved by embodiments explained below.

That is, a magnetic inline filter of an invention 1 includes: a double pipe composed of an inner pipe and an outer pipe disposed coaxially with each other, the double pipe being a cylindrical body for draining waste water including foreign matters, which are magnetic bodies, to a space, which is a gap between the inner pipe and the outer pipe; an inner circumferential surface side magnet disposed on an inner circumferential surface side of the inner pipe; an external circumferential surface side magnet disposed on an outer circumferential surface side of the outer pipe; and a relative driving device, which is driving device for moving the inner circumferential surface side magnet and the outer circumferential surface side magnet in the axial direction to keep the inner circumferential surface side magnet and the outer circumferential surface side magnet away from the space so that the foreign matters, which are retained and magnetized in the space and on circumferential surfaces of the inner pipe and the outer pipe, are demagnetized and discharged to an outside of the space, wherein the inner circumferential surface side magnet and the outer circumferential surface side magnet are disposed to be opposed to each other at different polarities.

In the magnetic inline filter of an invention 2 according to the invention 1, the axial direction length of the inner pipe is formed at least twice as long as the axial direction length of the outer pipe. In the inner circumferential surface side magnet and the outer circumferential surface side magnet, a plurality of magnets are stacked in the axial direction and disposed along an axial direction length substantially the same as the axial direction length of the outer pipe. In the inner circumferential surface side magnet, the plurality of magnets are disposed at equal angle intervals over the entire circumference of the inner circumferential surface of the inner pipe. In the outer circumferential surface side magnet, the plurality of magnets are disposed at equal angle intervals over the entire circumference of the outer circumferential surface of the outer pipe.

The magnetic inline filter of an invention 3 according to the invention 2 includes: an introduction port that is formed in the vicinity of the lower end of the axial direction length of the outer pipe and introduces waste water into the space; a supply port that is formed in the vicinity of the upper end of the axial direction length of the outer pipe and supplies the waste water cleaned in the space to a machining section; a discharge port that is formed below the introduction port in the outer pipe and discharges the foreign matters accumulated in the space to the outside of the space; and a switching valve that causes the space and the discharge port to communicate with each other during the discharge of the foreign matters.

The magnetic inline filter of an invention 4 according to the invention 3 includes: a coolant tank in which the magnetic inline filter is attached to an upper surface of the coolant tank and a coolant supplied to a machine tool is collected; a coolant pump that is attached to the upper surface of the coolant tank and supplies the coolant in the coolant tank to the introduction port; a coolant supply pipe that supplies the coolant from the supply port to a machining section of the machine tool; a coolant discharge pipe that discharges the coolant discharged from the discharge port to a coolant collecting section of the coolant tank; and a collection container that is attached to the coolant collecting section and has a predetermined filtration function for separating chips from the coolant discharged from the coolant discharge pipe and accumulating the chips.

The magnetic inline filter of an invention 5 according to one of the invention 1 to the invention 4 includes: an obstacle that is disposed in the space and used to reduce flow velocity of a part of a flow of the waste water.

In the magnetic inline filter of an invention 6 according to one of the invention 1 to the invention 4, the relative driving device is a fluid driving device, which drives the inner circumferential surface side magnet and the outer circumferential side magnet to move on a guide rod.

Effects of the Invention

In the structure of the magnetic inline filter of the present invention, the structure is simple, a magnetic field is intense, and a filtration ability is high. Since the magnetic field is intense, a special filter member is unnecessary. Chips attracted by the magnets are bridged. The coolant is caused to pass through gaps of the bridges chips. Consequently, it is also possible to perform precise filtration.

BRIEF DESCRIPTION OF THE DRAWINGS

FIG. 1(a) and FIG. 1(b) illustrate a magnetic inline filter in a first embodiment of the present invention, wherein FIG. 1(a) is a front view of the magnetic inline filter and FIG. 1(b) is a plan view of FIG. 1(a).

DESCRIPTION OF EMBODIMENTS

Figures 1A, 1B:
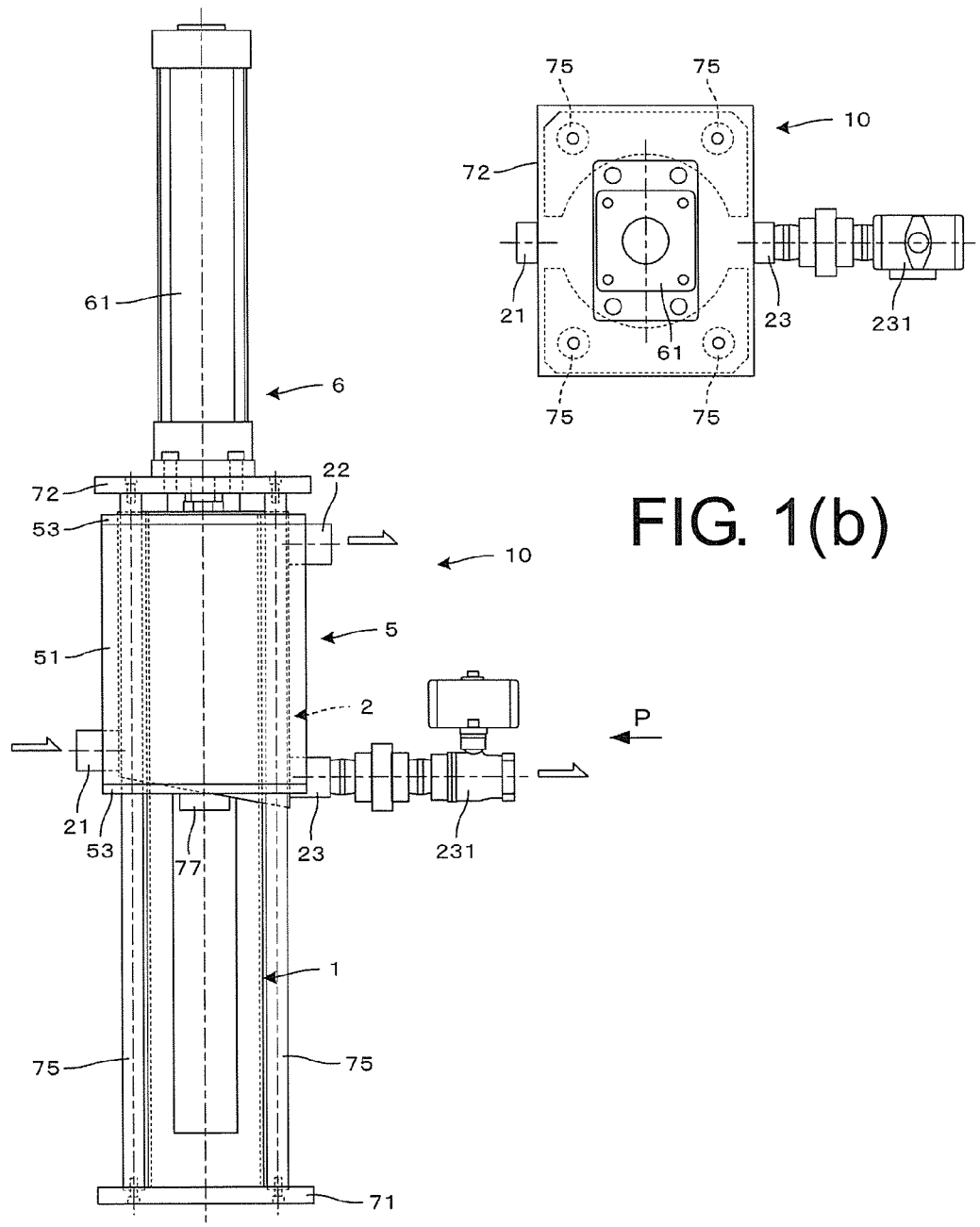
Figure 2:
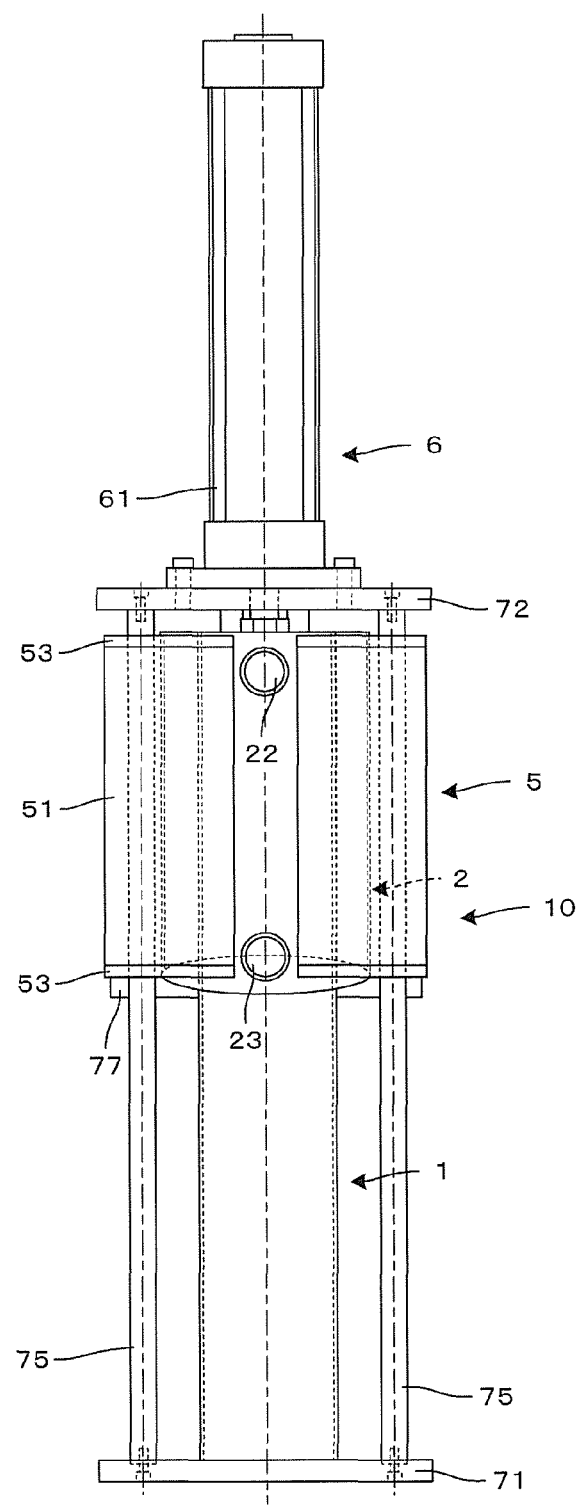
FIG. 2 is a P arrow view of FIG. 1(a).
Figure 3:
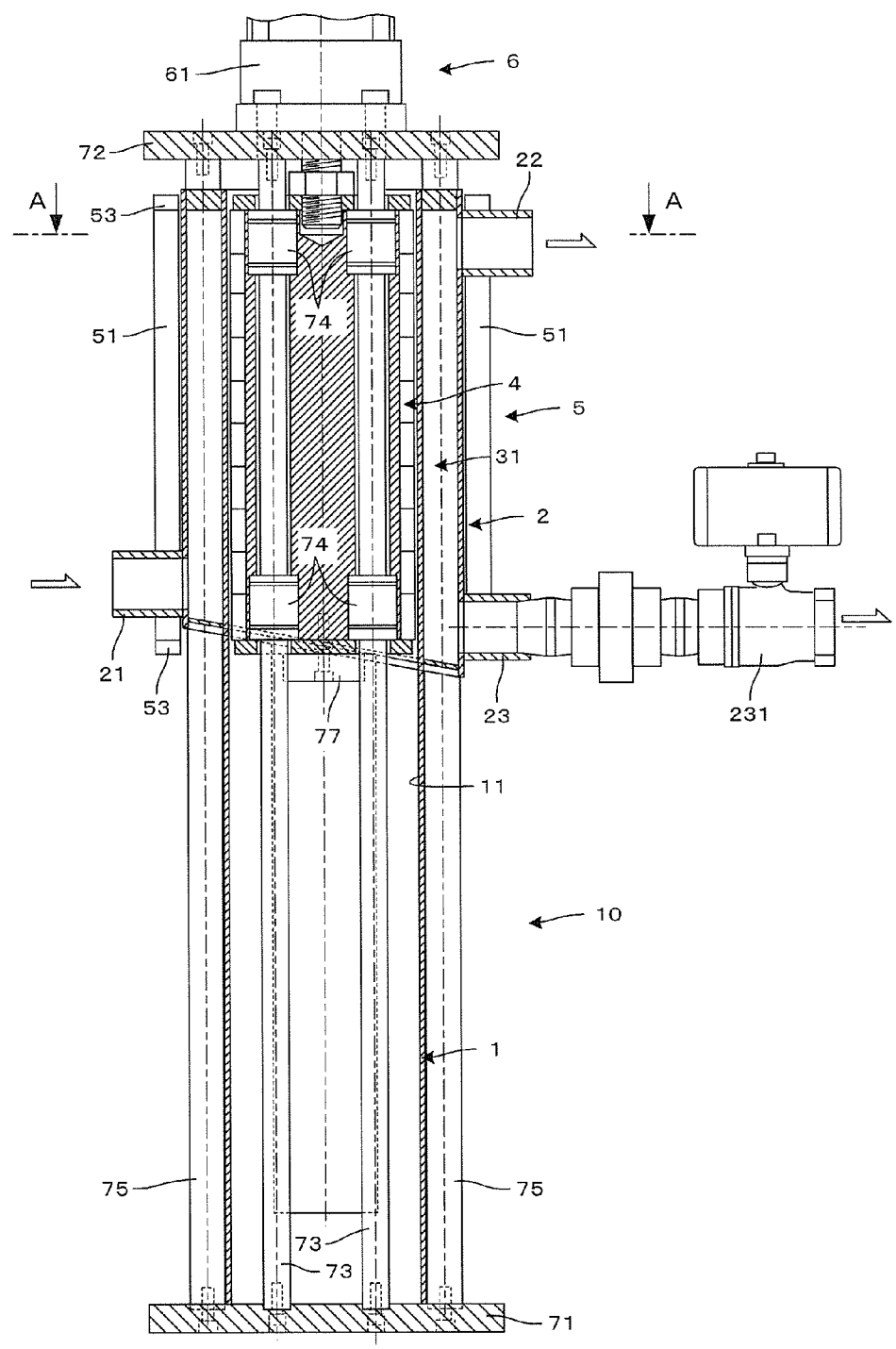
FIG. 3 is a longitudinal sectional view of FIG. 1(a).
Figure 4:
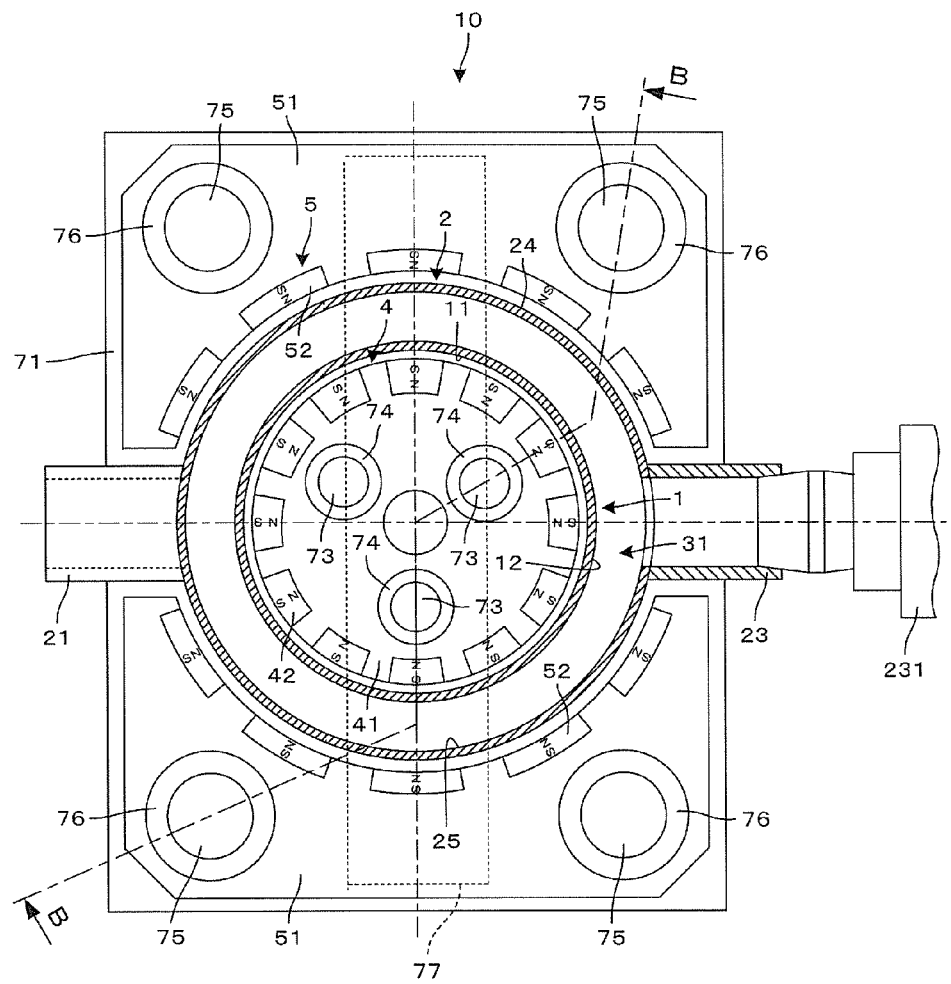
FIG. 4 is an A-A sectional view of FIG. 3.
Figure 5:
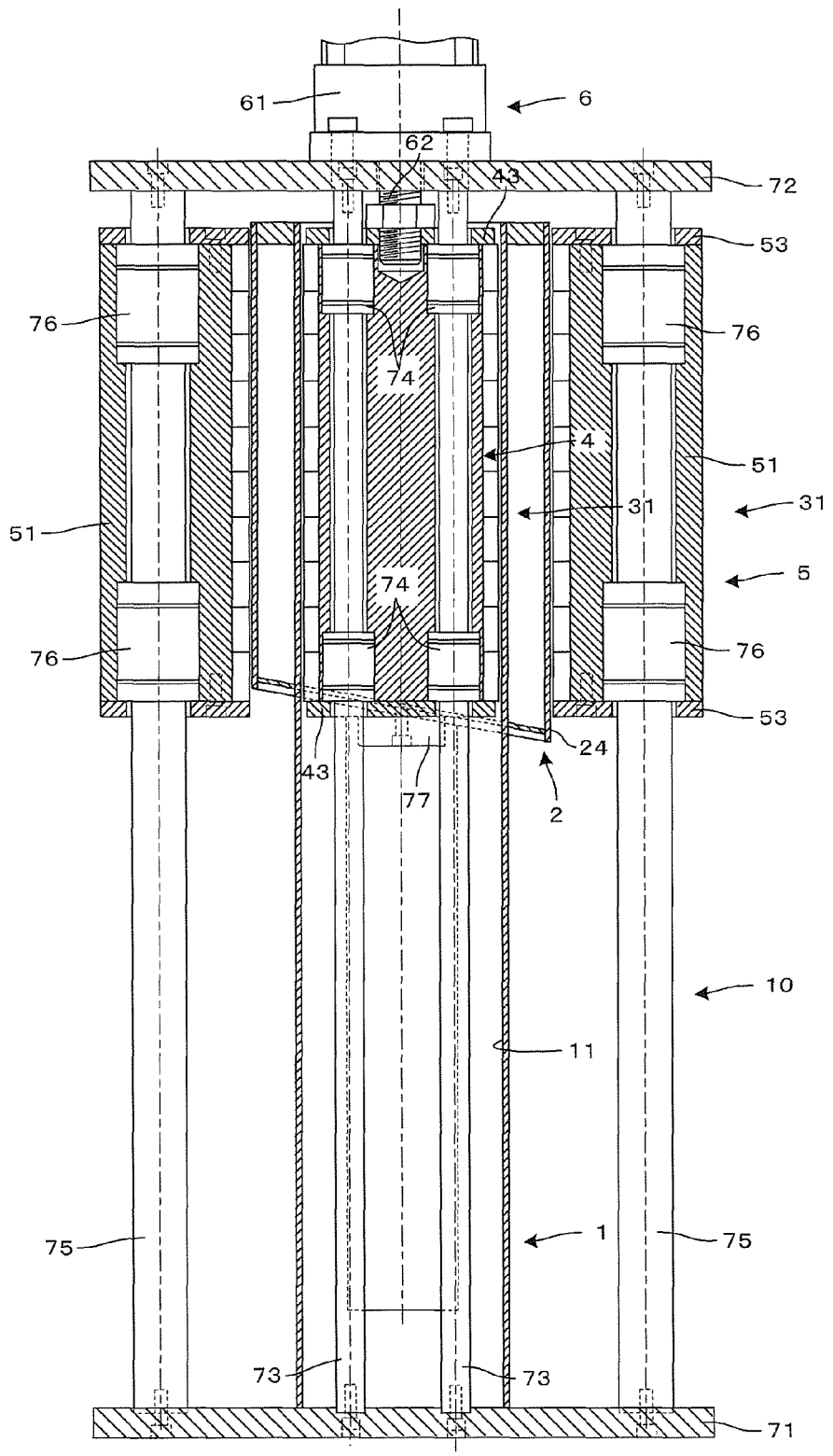
FIG. 5 is a B-B sectional view of FIG. 4.

A first embodiment of the present invention is explained below with reference to the drawings. FIG. 1(a) is a front view of a magnetic inline filter in the first embodiment of the present invention. FIG. 1(b) is a plan view of FIG. 1(a). FIG. 2 is a P arrow view of FIG. 1(a). FIG. 3 is a longitudinal sectional view of FIG. 1(a). FIG. 4 is an A-A sectional view of FIG. 3. FIG. 5 is a B-B sectional view of FIG. 4. As an example of a method of using the magnetic inline filter in the embodiment of the present invention, in a machine tool, the magnetic inline filter is disposed halfway in a piping route for supplying a coolant to a machining section or the like. That is, chips of a machined workpiece and chips washed away from a jig are collected in a coolant tank together with the coolant, after large chips are collected by a chip conveyor. The collected coolant is introduced into the magnetic inline filter in the embodiment of the present invention. Particulates mixed in the coolant are separated from the coolant and collected.

As shown in FIG. 1 to FIG. 5, a magnetic inline filter 10 in the first embodiment of the present invention includes a cylindrical body 3 (see FIG. 9) configured by an inner pipe 1 and an outer pipe 2 formed of a nonmagnetic body such as austenite-based stainless steel. More specifically, the magnetic inline filter 10 is configured by the cylindrical body 3, an inner circumferential surface side magnet 4 disposed on the inner circumferential surface of the inner pipe 1, an outer circumferential surface side magnet 5 disposed on the outer circumferential surface of the outer pipe 2, a relative driving device 6 which moves the inner circumferential surface side magnet 4 and the outer circumferential surface side magnet 5 in the axial direction, and the like.

Figure 9:
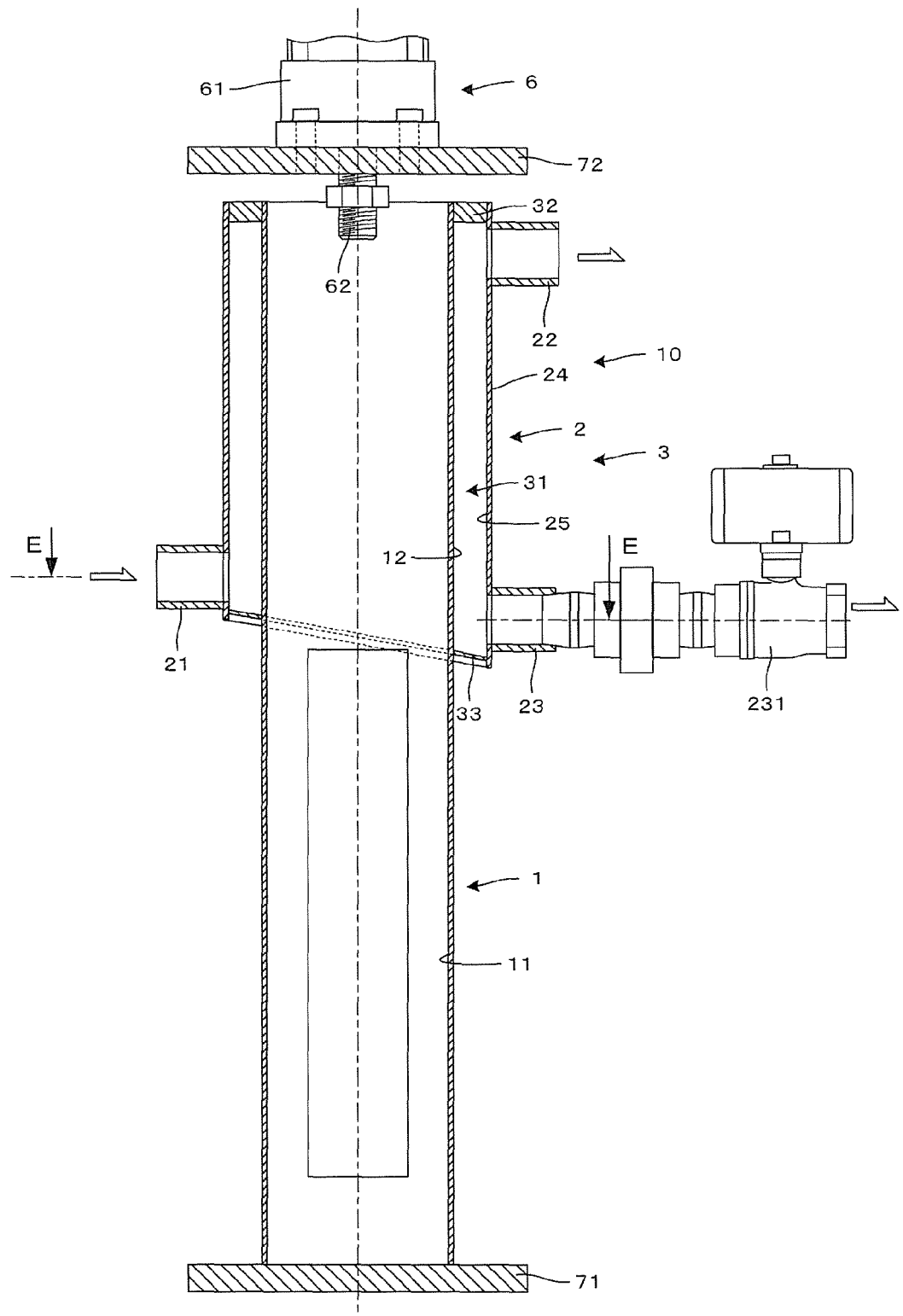
FIG. 9 is a sectional view showing only a cylindrical body shown in FIG. 5.
Figure 10:
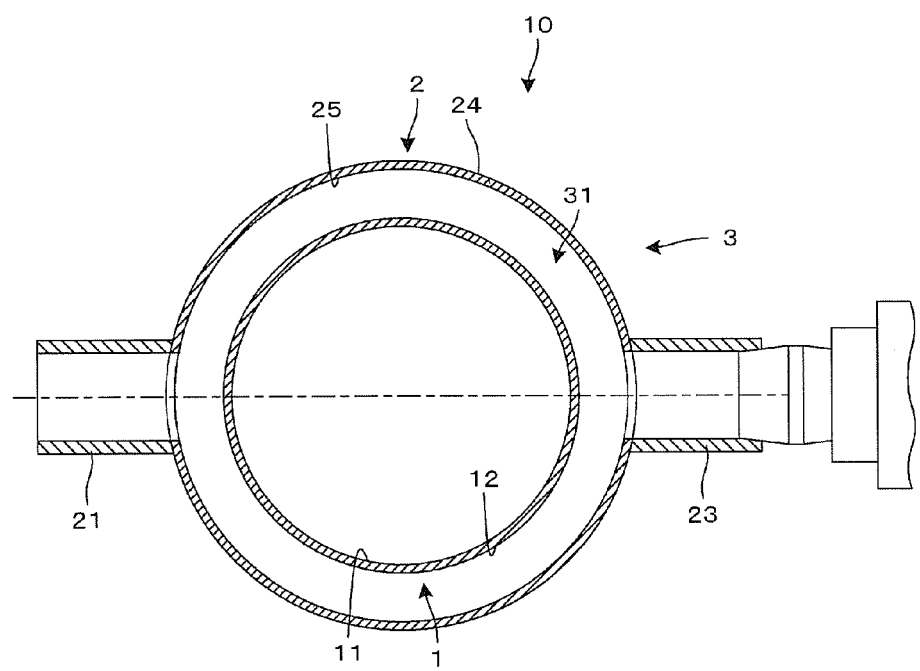
FIG. 10 is an E-E sectional view of FIG. 9.

FIG. 9 is a longitudinal cross section showing only the cylindrical body 3 shown in FIG. 5. FIG. 10 is an E-E sectional view of FIG. 9. As shown in FIG. 9 to FIG. 10, the cylindrical body 3 is a double pipe in which the cylindrical inner pipe 1 and the cylindrical outer pipe 2 are coaxially disposed. The axial direction length of the inner pipe 1 is formed at least twice, in this example, as long as the axial direction length of the outer pipe 2. The lower end of the inner pipe 1 is fixed to a rectangular bottom plate 71 by welding and vertically erected. This is for the purpose of enabling the inner circumferential surface side magnet 4 and the outer circumferential surface side magnet 5 to be completely retracted from a space 31. The outer pipe 2 is disposed in an upper part of the inner pipe 1. The coolant flows in the space 31, which is a gap between the inner pipe 1 and the outer pipe 2. An upper lid 32 is welded to the upper end of the space 31 and a bottom lid 33 is welded to the lower end of the space 31 to integrate the inner pipe 1 and the outer pipe 2 and define and seal the space 31.

An introduction port 21 for introducing the coolant (waste water mixed with chips) to the space 31 is formed in the vicinity of the lower end of the axial direction length of the outer pipe 2. A supply port 22 for supplying the coolant cleaned in the space 31 to the machining section is formed in the vicinity of the upper end of the axial direction length of the outer pipe 2. In the outer pipe 2, a discharge port 23 is formed below the introduction port 21. The discharge port 23 discharges the chips accumulated in the space 31 to the outside of the space 31. A switching valve 231 actuated by a solenoid is coupled and attached to the discharge port 23. During the discharge of the chips, the discharge port 23 is caused to communicate with a coolant collecting section on the coolant tank side. The switching valve 231 shuts off the discharge port 23 during filtration of the coolant. As shown in FIG. 9, the bottom lid 33 is formed as an inclined surface that declines from the introduction port 21 toward the discharge port 23 to enable the chips to be easily discharged to the outside from the discharge port 23 with the gravity of the chips and the flow velocity (the dynamic pressure) of the coolant.

Figures 6A, 6B:
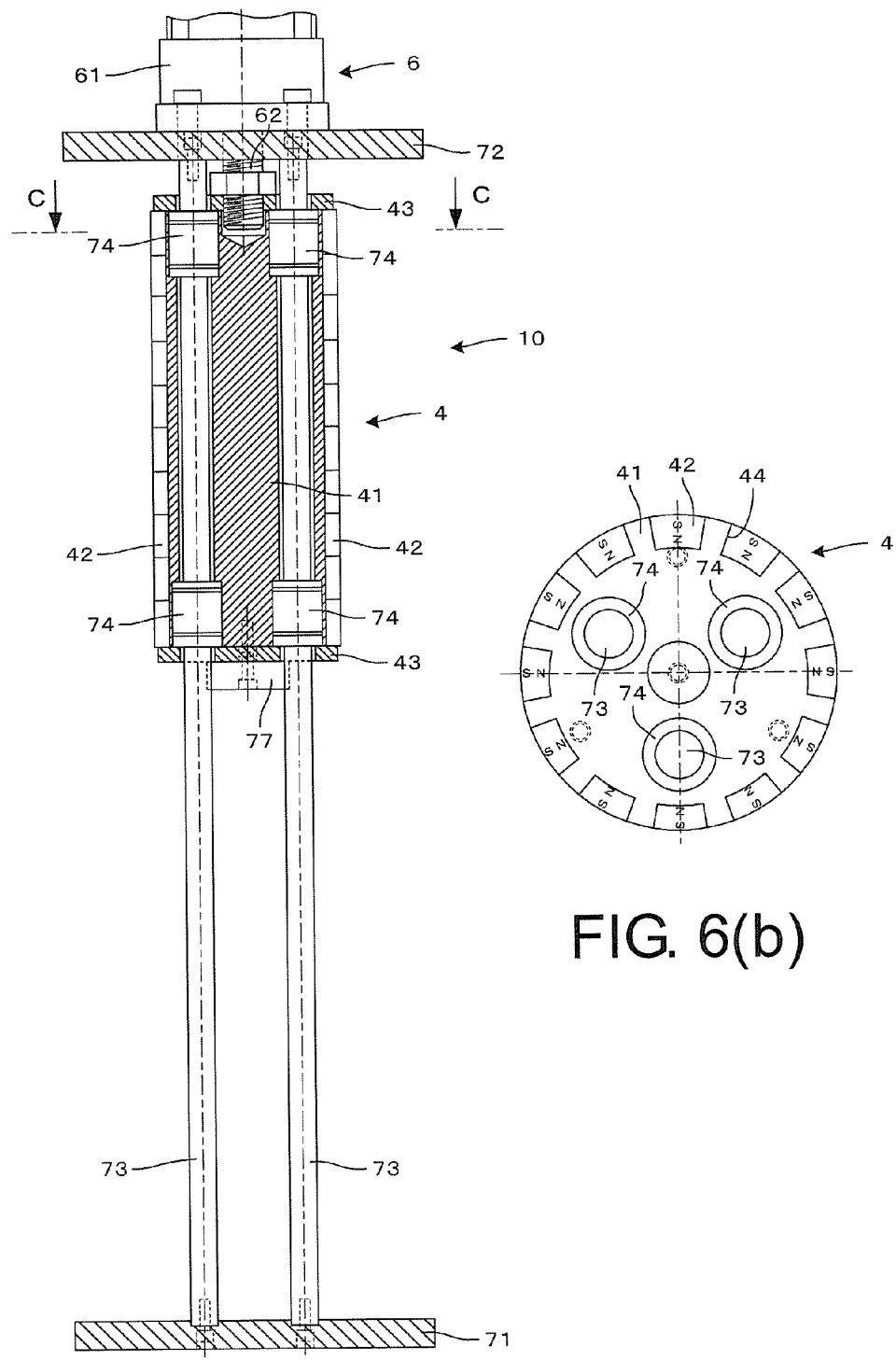
FIG. 6(a) is a longitudinal cross section showing only an inner circumferential surface side magnet in FIG. 5.
FIG. 6(b) is a C-C end sectional view of FIG. 6(a).

FIG. 6(*a*) is a longitudinal cross section showing only the inner circumferential surface side magnet 4 shown in FIG. 5. FIG. 6(*b*) is a C-C end sectional view of FIG. 6(*a*). As shown in FIG. 3 to FIG. 6, on an inner circumferential surface 11 of the inner pipe 1, the inner circumferential surface side magnet 4 is disposed to have a slight gap between the inner circumferential surface side magnet 4 and the inner circumferential surface 11. In the inner circumferential surface side magnet 4, magnets 42 are retained and fixed to a cylindrical magnet retaining body 41. On the outer circumferential surface of the magnet retaining body 41, a plurality of recessed grooves (see FIG. 6(*b*)) 44 are formed at a fixed interval. The magnets 42 are respectively fixed to the recessed grooves 44 by an adhesive. The magnet retaining body 41 has an axial direction length substantially the same as the axial direction length of the outer pipe 2. The material of the magnet retaining body 41 is made of magnetic metal such as structural steel. The magnets 42 are formed in a bent trapezoid. A plurality of (twelve) magnets 42 are disposed at an equal angle (30 degrees) over the entire circumference of the inner circumferential surface 11 of the inner pipe 1. In this embodiment, ten magnets 42 are stacked in the axial direction and disposed over an axial direction length substantially the same as the axial direction length of the outer pipe 2.

The inner circumferential surface side magnet 4 is movable in the axial direction of the inner pipe 1 and is driven between a filtration position opposed to the space 31 and a cleaning position set away from the space 31. That is, as shown in FIG. 3 to FIG. 6, three columnar guide rods 73 made of the structural steel are vertically fixed between the rectangular bottom plate 71 and a rectangular top plate 72. The top plate 72 is disposed to have a slight gap in an upper part of the cylindrical body 3. The guide rods 73 extend up and down piercing through the magnet retaining body 41 and are slidably assembled to cylindrical linear bushes 74, 74. The linear bushes 74, 74 are fixed to the upper end and the lower end of the magnet retaining body 41 by pressing plates 43, 43. The pressing plates 43, 43 have a disc shape and are fixed to the upper end face and the lower end face of the magnet retaining body 41. A plurality of balls (not shown in the figure) are rollably interposed between the guide rods 73 and the linear bushes 74, 74 to enable a light linear motion.

A fluid cylinder 61, which is fluid driving device, is fixed to the upper surface of the top plate 72. A piston rod 62 projecting from the lower end of the fluid cylinder 61 is screwed into and fixed to the upper end face of the magnet retaining body 41. Therefore, by switching a hydraulic pressure supplied to the fluid cylinder 61, the inner circumferential surface side magnet 4 is driven between the filtration position opposed to the space 31 and the cleaning position set away from the space 31.

Figure 7:
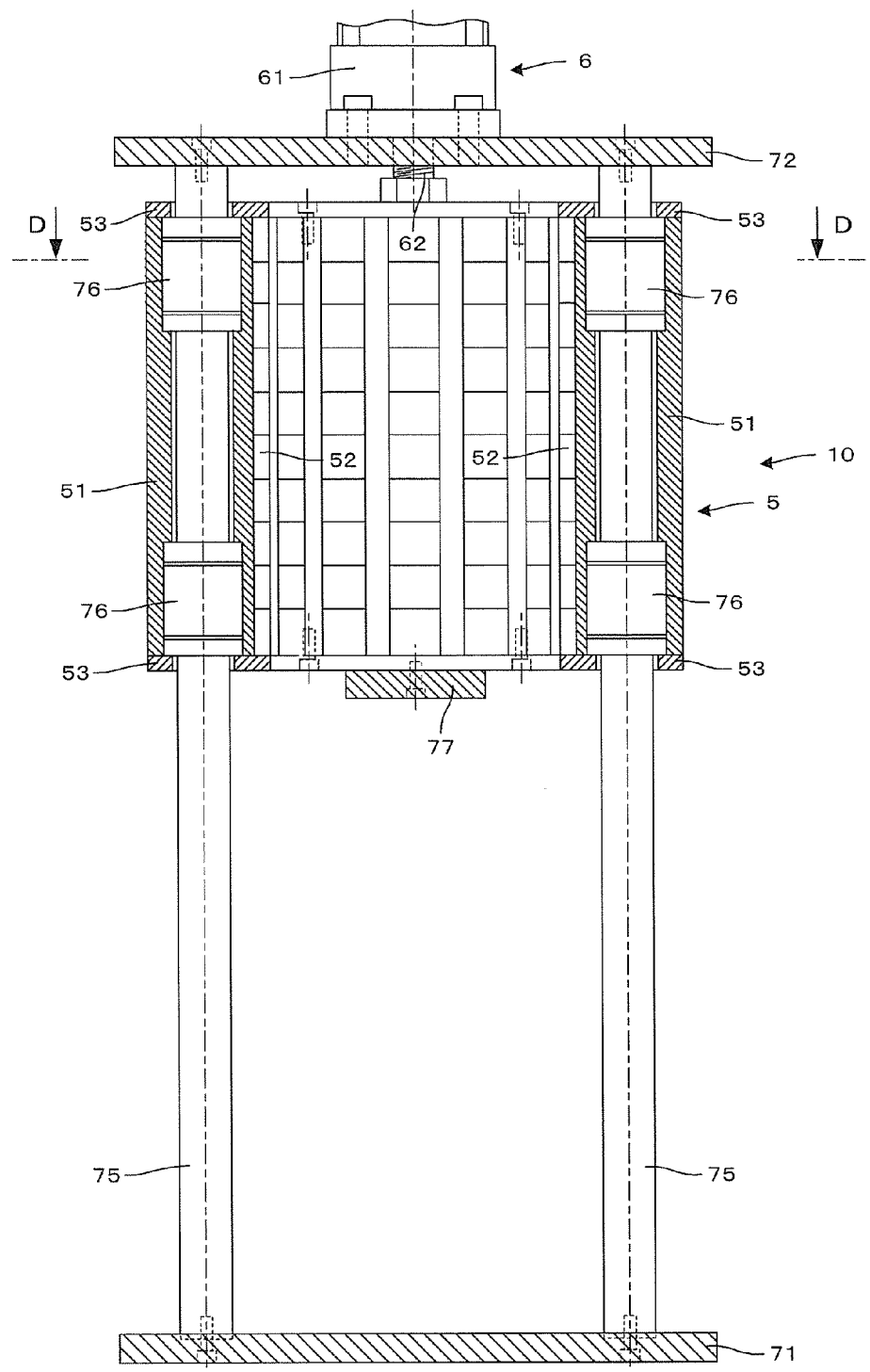
FIG. 7 is a longitudinal sectional view showing only an outer circumferential side magnet shown in FIG. 5.
Figure 8:
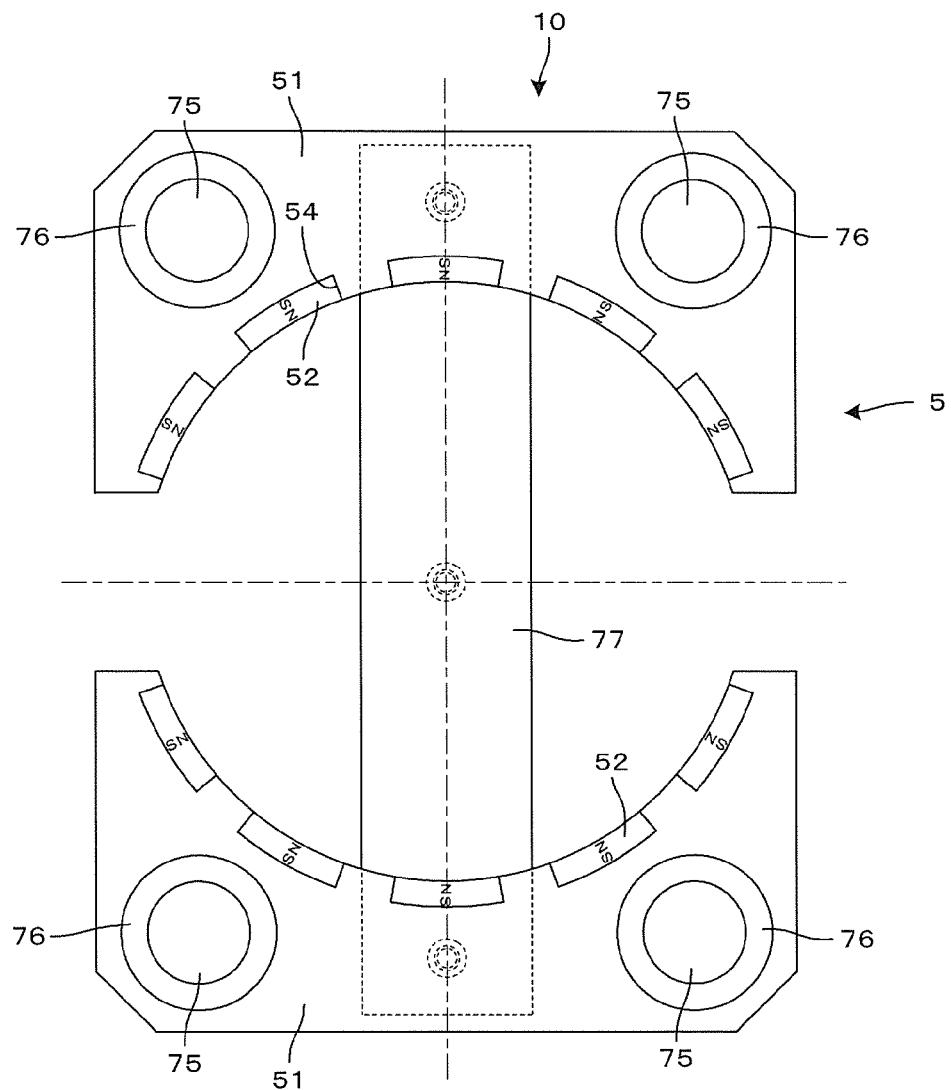
FIG. 8 is a D-D sectional view of FIG. 7.

FIG. 7 is a longitudinal cross section showing only the outer circumferential surface side magnet 5 shown in FIG. 5. FIG. 8 is a D-D sectional view of FIG. 7. As shown in FIG. 3 to FIG. 8, on an outer circumferential surface 24 of the outer pipe 2, the outer circumferential surface side magnet 5 is disposed to have a slight gap between the outer circumferential surface side magnet 5 and the outer circumferential surface 24. The outer circumferential surface side magnet 5 includes two semi-arcuate columnar magnet retaining bodies 51, 51 convex to the outer side (see FIG. 8). A plurality of recessed grooves (see FIG. 8) 54 are formed on the inner circumferential surfaces of the magnet retaining bodies 51, 51. Magnets 52 are respectively fixed to the recessed grooves 54 by an adhesive. The magnet retaining bodies 51, 51 are formed at an axial direction length substantially the same as the axial direction length of the outer pipe 2 and molded of magnetic metal such as structural steel. The shape of the magnets 52 viewed from above is a sector, more accurately, a figure surrounded by radiuses passing both the ends of two arcs, which are concentric and have different radiuses, and the two arcs. A plurality of (ten) magnets 52 are disposed at an equal angle (30 degrees) interval over the entire circumference of the outer circumferential surface 24 of the outer pipe 2. Ten magnets 52 are stacked in the axial direction and disposed over an axial direction length substantially the same as the axial direction length of the outer pipe 2.

The outer circumferential surface side magnet 5 is moveable in the axial direction of the outer pipe 2 and is driven between a filtration position opposed to the space 31 and a cleaning position set away from the space 31. That is, as shown in FIG. 3 to FIG. 8, four columnar guide rods 75 are vertically fixed between the rectangular bottom plate 71 and the rectangular top plate 72. Two guide rods 75 extend up and down piercing through the respective magnet retaining bodies 51, 51 and are slidably assembled to cylindrical linear bushes 76, 76 fixed to the magnet retaining bodies 51, 51. The linear bushes 76, 76 are fixed to the upper ends and the lower ends of the magnet retaining bodies 51, 51 by pressing plates 53, 53. The pressing plates 53, 53 are semi-arcuate plates and fixed to the upper end faces and the lower end faces of the magnet retaining bodies 51, 51. A plurality of balls (not shown in the figure) are rollably interposed between the guide rods 75 and the linear bushes 76, 76 to enable a light linear motion of the magnet retaining bodies 51, 51.

The outer circumferential surface side magnet 5 is driven in synchronization with the inner circumferential surface side magnet 4. The pressing plate 53 at the lower end of the outer circumferential surface side magnet 5 and the pressing plate 43 at the lower end of the inner circumferential surface side magnet 4 are coupled by a rectangular coupling plate 77. Therefore, by switching a hydraulic pressure supplied to the fluid cylinder 61, the inner circumferential surface side magnet 4 and the outer circumferential surface side magnet 5 are driven in synchronization with each other between the filtration position opposed to the space 31 and the cleaning position (a discharge position for chips) away from the space 31. That is, the relative driving device 6 of the present invention is configured by the guide rods 73, the guide rods 75, the linear bushes 74, 74, the linear bushes 76, 76, and the fluid cylinder 61.

Actuation

As shown in FIGS. 4, 5, and 6, the magnets 42 of the inner circumferential surface side magnet 4 are fixed to the magnet retaining body 41, which is a magnetic body. Therefore, a line of magnetic force starts from the N pole to exit to the air and terminates in the S pole. In this case, the inner pipe 1 made of the nonmagnetic body is most contiguous to the magnets 42. Therefore, the line of magnetic force is not bent. When chips flow to this magnetic field, the chips are captured on an outer circumferential surface 12 of the inner pipe 1. Similarly, the magnets 52 of the outer circumferential surface side magnet 5 are fixed to the magnet retaining body 51, which is a magnetic body. Therefore, a line of magnetic force starts from the N pole to exit to the air and terminates in the S pole. In this case, the outer pipe 2 made of the nonmagnetic body is most contiguous to the magnets 52. Therefore, the line of magnetic force is not bent. When chips flow to this magnetic field, the chips are captured on an inner circumferential surface 25 of the outer pipe 2.

On the other hand, as shown in FIG. 4, FIG. 6, and FIG. 8, the inner circumferential surface side magnet 4 and the outer circumferential surface side magnet 5 are disposed to be opposed to each other at different polarities. In the magnets 42 of the inner circumferential surface side magnet 4, the outer circumferential surface side is set to the S pole and the inner circumferential surface side is set to the N pole. In the magnets 52 of the outer circumferential surface side magnet 5, the inner circumferential surface side is set to the N pole and the outer circumferential surface side is set to the S pole. Usually, it is known that an attractive force acts when the N pole of another magnet is brought close to the S pole of a magnet. That is, a line of magnetic force exits the N pole having a positive quantity of magnetism and enters the S pole having a negative quantity of magnetism. Therefore, a line of magnetic force entering the S pole having the negative quantity of magnetism from the N pole having the positive quantity of magnetism is formed between the magnets 52 of the outer circumferential surface side magnet 5 and the magnets 42 of the inner circumferential surface side magnet 4. In this way, since a magnetic filed in a radiation direction is intensified, chips, which are magnetic bodies, in the coolant are attracted to the wall surfaces on both the sides of the space 31 (the outer circumferential surface 12 of the inner pipe 1 and the inner circumferential surface 25 of the outer pipe 2). The attracted chips are accumulated and bridged. As a result, by causing the coolant to pass through gaps of the bridges chips, it is possible to perform precise filtration. Since the magnetic filed in the radiation direction is intense and the chips are efficiently attracted, a special filter member is unnecessary.

As shown in FIG. 1 to FIG. 5, the piston rod 62 of the fluid cylinder 61 is retracted to the top to locate the inner circumferential surface side magnet 4 and the outer circumferential surface side magnet 5 respectively in the filtration positions opposed to the space 31 of the cylindrical body 3. In this state, the solenoid of the switching valve 231 is actuated to shut off the discharge port 23. The coolant is introduced into the space 31 from the introduction port 21 in the vicinity of the lower end of the outer pipe 2. The coolant is supplied to the machining section from the supply port 22 in the vicinity of the upper end of the outer pipe 2. Since the magnetic field in the radiation direction is intense, the chips in the coolant are attracted to the wall surfaces on both the sides of the space 31 and the coolant is filtrated. When the supply of the coolant is continued, the chips attracted to the wall surfaces are accumulated and bridged. As a result, since the coolant passes through gaps of the bridged chips, it is possible to perform precise filtration.

Figure 11:
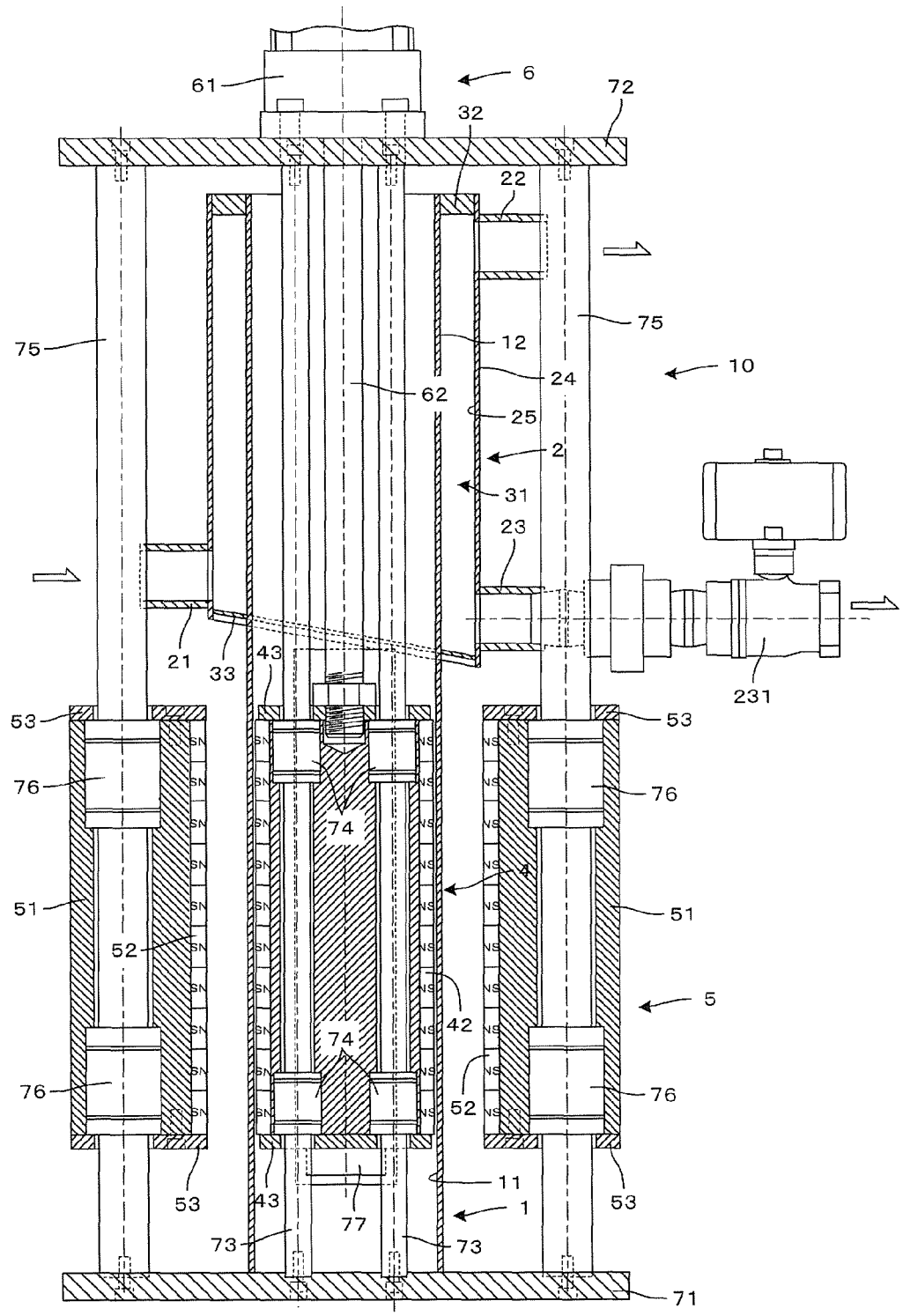
FIG. 11 is a longitudinal cross section showing a state in which the inner circumferential surface side magnet and the outer circumferential surface side magnet are lowered to a cleaning position.

When machining of a workpiece ends, as shown in FIG. 11, the piston rod 62 of the fluid cylinder 61 is stretched to the bottom end to locate the inner circumferential surface side magnet 4 and the outer circumferential surface side magnet 5 in the cleaning positions set away from the space 31. Therefore, the magnetism acting in the space 31 disappears and the chips attracted to the wall surfaces on both the sides of the space 31 easily separate from the wall surface of the space 31. The solenoid of the switching valve 231 is actuated to cause the discharge port 23 to communicate with the coolant collecting section on the coolant tank side. The coolant is introduced into the space 31 from the introduction port 21 in the vicinity of the lower end of the outer pipe 2. The coolant is discharged from the discharge port 23 present below the introduction port 21. The bottom lid 33 is formed as the inclined surface descending from the introduction port 21 toward the discharge port 23. Therefore, the chips accumulated in the space 31 are easily discharged from the discharge port 23 to the outside by the gravity and the dynamic pressure of the coolant.

Second Embodiment of the Magnetic Inline Filter

Figure 12A:
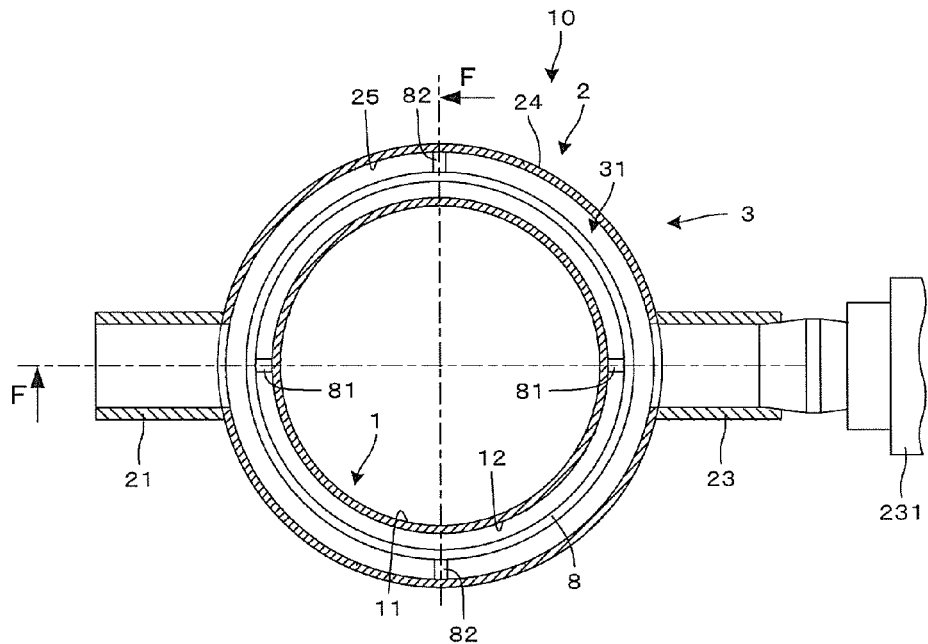
FIG. 12(a) is a diagram showing a magnetic inline filter in a second embodiment of the present invention and equivalent to FIG. 10 in the first embodiment.
Figure 12B:
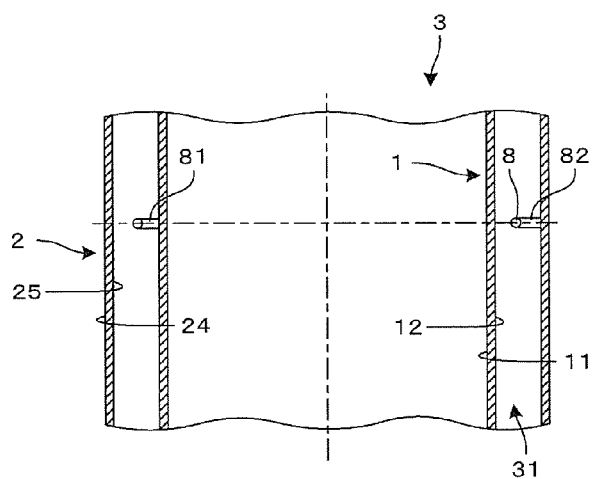
FIG. 12(b) is an F-F sectional view of FIG. 12(a).

FIG. 12(*a*) is a diagram showing the magnetic inline filter 10 in a second embodiment of the present invention and equivalent to FIG. 10 in the first embodiment. FIG. 12(*b*) is an F-F sectional view of FIG. 12(*a*). The magnetic inline filter 10 in the second embodiment is a modification of the magnetic inline filter 10 in the first embodiment, and is an example in which an obstacle is formed in the space 31 to reduce the flow velocity of a part of a flow of a coolant. In the following explanation, only structural portions different from the structural portions in the first embodiment are explained. Redundant explanation is omitted. The same components are explained with the same numbers added to the components.

As shown in FIG. 12, the cylindrical body 3 of the magnetic inline filter 10 in the second embodiment of the present invention is a double pipe, in which the cylindrical inner pipe 1 and the cylindrical outer pipe 2 are coaxially disposed. In the space 31, which is the gap between the inner pipe 1 and the outer pipe 2, an annular ring (obstacle) 8 having a circular cross section is disposed. The ring 8 is supported on the outer circumferential surface 12 of the inner pipe 1 and the inner circumferential surface 25 of the outer pipe 2 by supporting rods 81, 82. The ring 8 is formed of ferromagnetic metal. The two supporting rods 81 weld and fix the outer circumferential surface 12 of the inner pipe 1 and the ring 8. Two supporting rods 82 weld and fix the inner circumferential surface 25 of the outer pipe 2 and the ring 8.

The flow velocity of the coolant flowing in the space 31 is low in the vicinity of the outer circumferential surface 12 of the inner pipe 1 and the vicinity of the inner circumferential surface 25 of the outer pipe 2 and is the highest in the center portion of the space 31. When the ring 8 is disposed in the center portion of the space 31, since the flow velocity in the center portion of the space 31 decreases, chips in the coolant easily adhere to the wall surfaces on both the sides of the space 31. Therefore, it is possible to perform more precise filtration. The ring 8 may be set in a plurality of places in the axial direction of the cylindrical body 3.

Third Embodiment of the Magnetic Inline Filter

Figure 13:
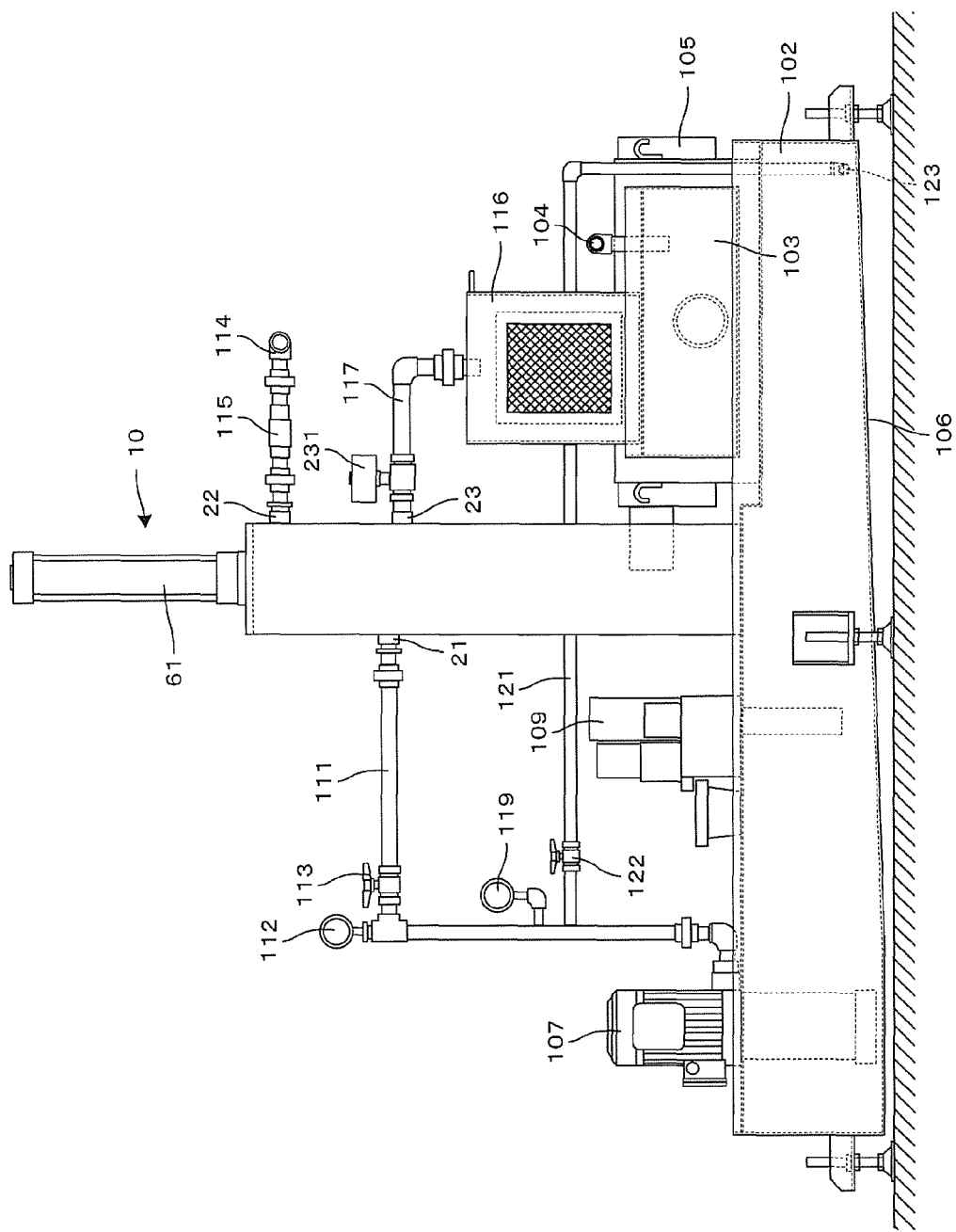
FIG. 13 is an overall front view showing a magnetic inline filter in a third embodiment of the present invention and showing an example in which the magnetic inline filter is attached to a coolant tank of a grinder.
Figure 14:
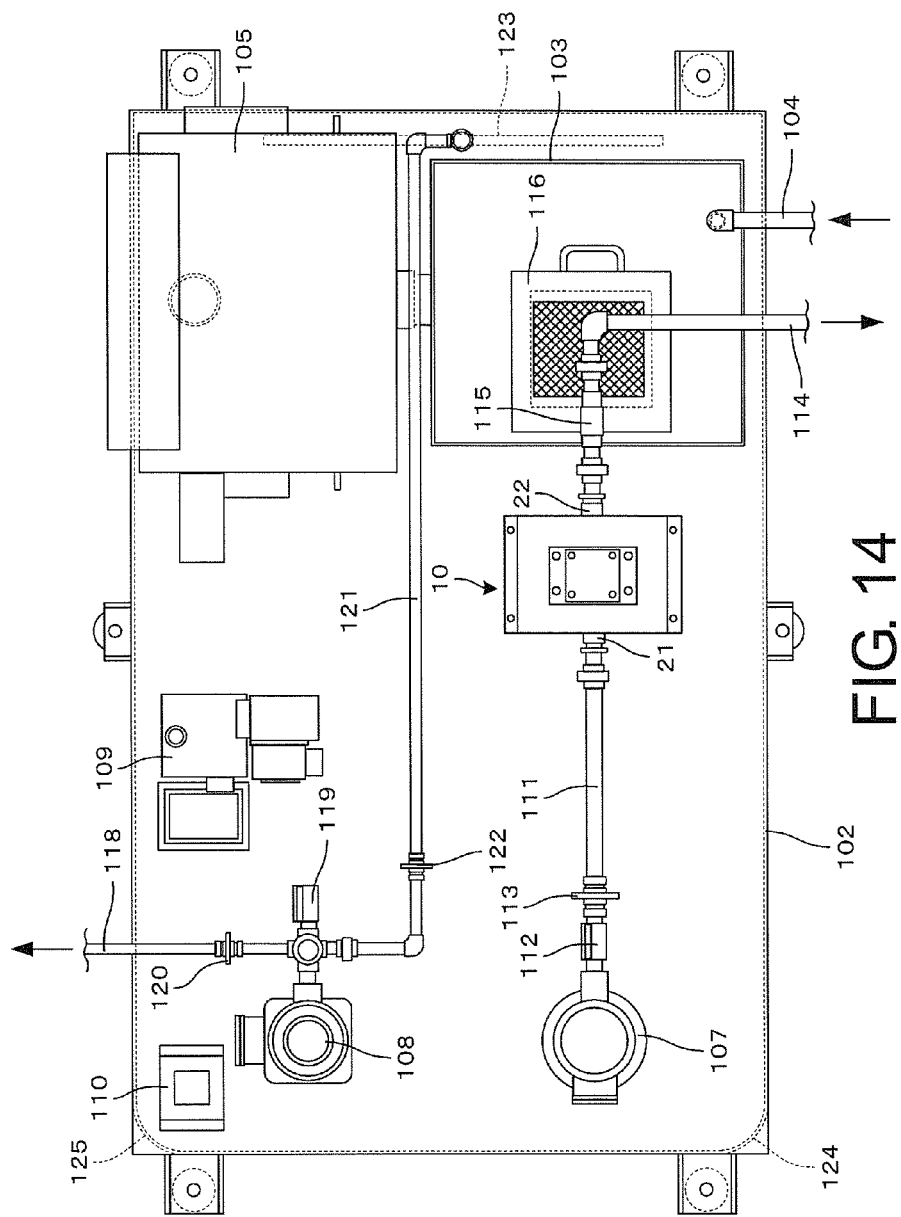
FIG. 14 is a plan view of FIG. 13.
Figure 15:
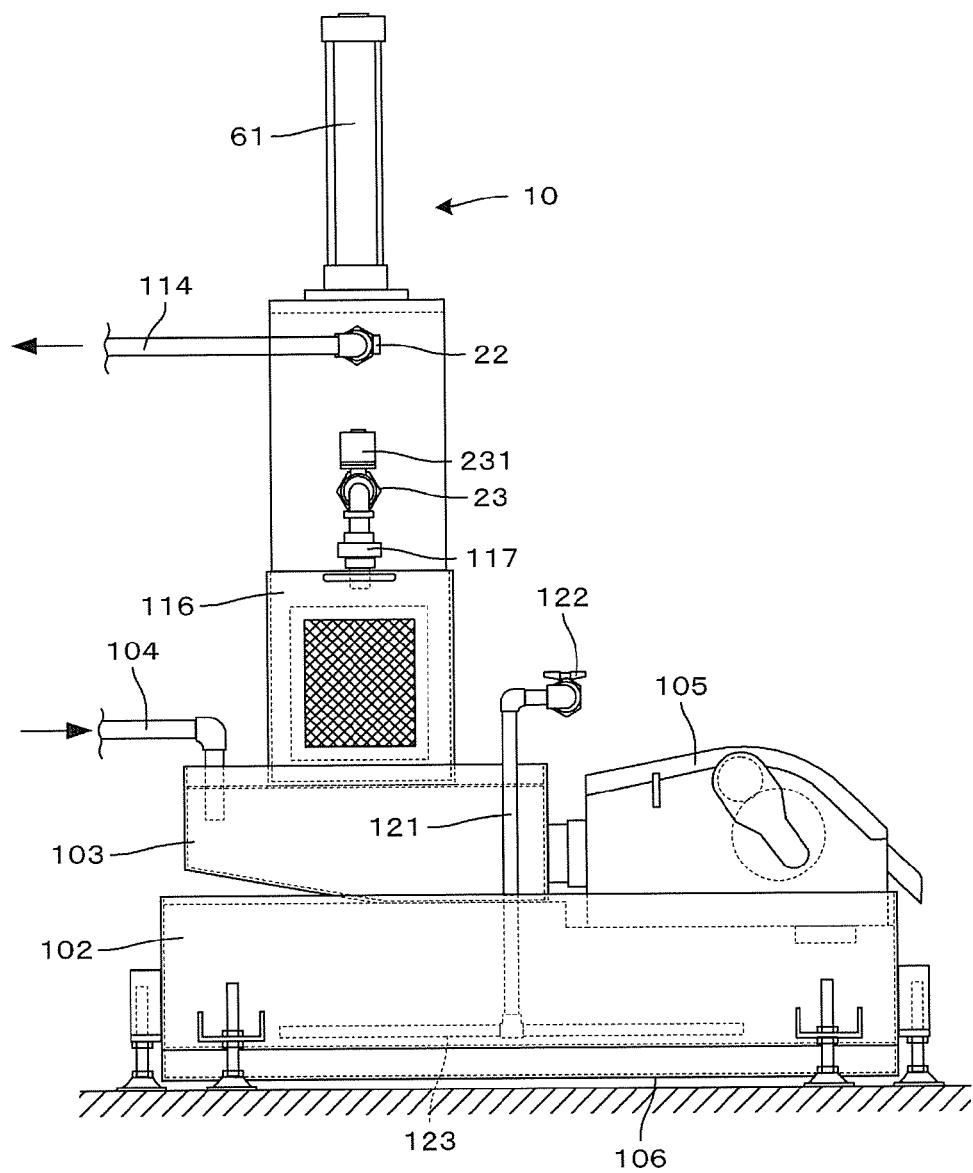
FIG. 15 is a right side view of FIG. 13.
Figure 16:
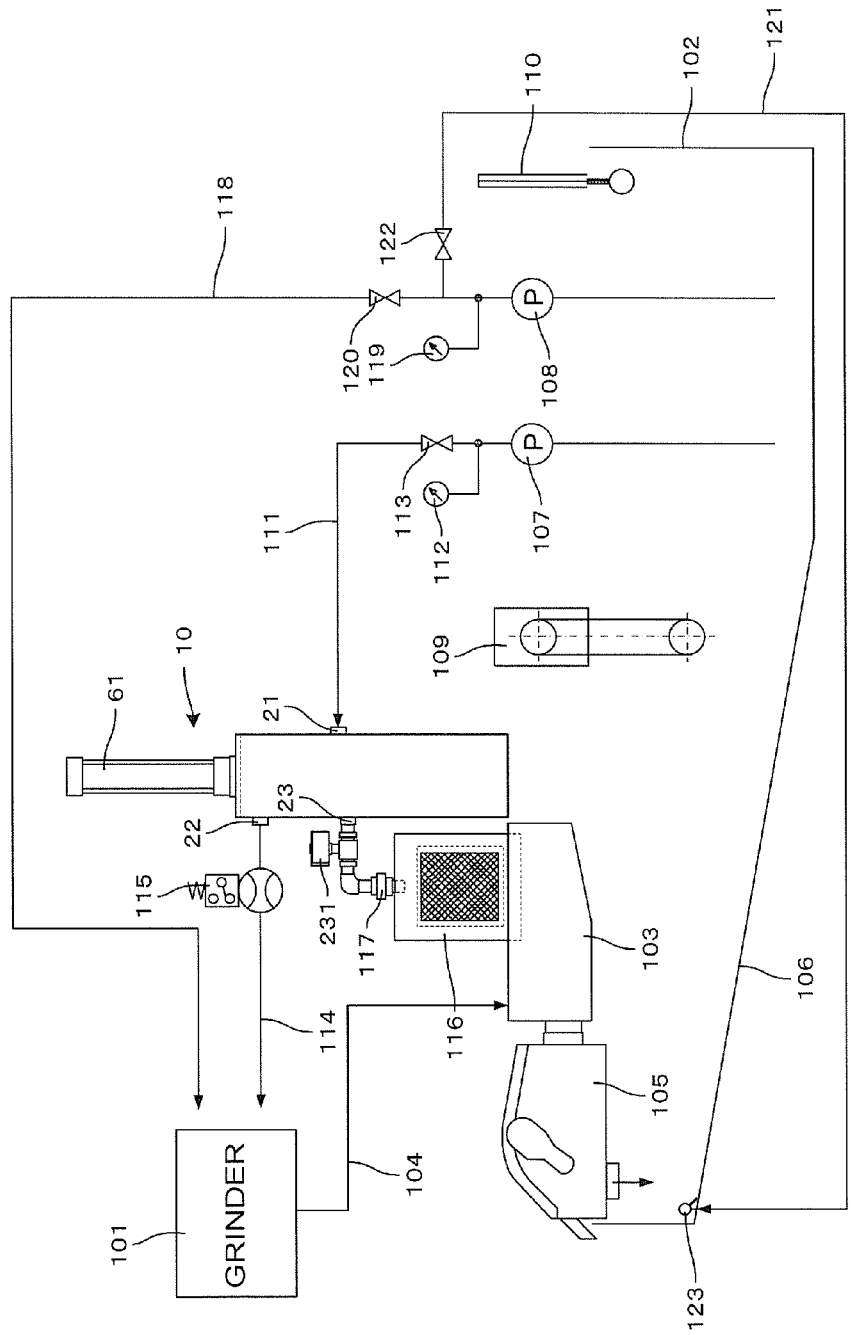
FIG. 16 is a piping diagram of FIG. 13.

FIG. 13 is an overall front view showing the magnetic inline filter 10 in a third embodiment of the present invention and showing an example in which the magnetic inline filter 10 is attached to a coolant tank of a grinder. FIG. 14 is a plan view of FIG. 13. FIG. 15 is a right side view of FIG. 13. FIG. 16 is a piping diagram of FIG. 13. The magnetic inline filter 10 in the third embodiment is an example in which the magnetic inline filter 10 in the first embodiment is attached to a coolant tank of a grinder (a machine tool). In the following explanation, only structural portions different from the structural portions in the embodiments explained above are explained. Redundant explanation is omitted. The same components are explained with the same numbers added to the components.

As shown in FIG. 13 to FIG. 16, the magnetic inline filter 10 in the third embodiment of the present invention is fixed to the upper surface of a coolant tank 102, which supplies a coolant to a grinder 101 shown in FIG. 16, by not-shown bolts. A rectangular coolant collection box (a coolant collecting section) 103 is placed adjacent to the magnetic inline filter 10 on the upper surface of the coolant tank 102. Chips of a workpiece machined by the grinder 101 and chips washed away from a jig are collected in the coolant collection box 103 through a coolant collection pipe 104 together with the coolant after large chips are collected by a not-shown chip conveyor.

The coolant collected in the coolant collection box 103 flows into a magnetic separator 105. The chips are separated from the coolant by a rotating magnet drum. The coolant, from which the chips are separated, is discharged to the coolant tank 102. The coolant tank 102 is made of stainless steel. A bottom surface 106 is formed as an inclined surface descending to the left when viewed in FIG. 13. Since the coolant tank 102 is made of stainless steel, the chips easily flow on the inclined surface of the bottom surface 106. An amount of sludge accumulating on the bottom surface 106 is reduced and rust does not occur. Therefore, cleaning is easy. On the upper surface of the coolant tank 102, a belt-type oil skimmer 109 is placed on the left of a magnet separator 105 to separate floating oil from the coolant in the coolant tank 102 and prevent decomposition of the coolant. On the upper surface of the coolant tank 102, a float-type level gauge 110 is placed at the left end upper corner of the coolant tank 102. The float-type level gauge 110 detects an upper limit and a lower limit of a coolant level of the coolant tank 102 and displays an alarm on a screen of a not-shown operation panel of the grinder 101.

On the upper surface of the coolant tank 102, a coolant pump for machining 107 and a coolant pump for chip draining 108 are placed in the vicinity of the left end of the coolant tank 102. R plates 124 and 125 are set at both corners at the left end of the coolant tank 102 to prevent sludge precipitating at corners of the coolant tank 102 and facilitate cleaning of the coolant tank 102. The coolant pump for machining 107 supplies the coolant in the coolant tank 102 to the introduction port 21 of the magnetic inline filter 10. A pressure gauge 112 and a manual switching valve 113 are attached halfway in a pipe 111 that connects the coolant pump for machining 107 and the introduction port 21. As explained in the first embodiment, the chips in the coolant supplied to the introduction port 21 are attracted to the wall surfaces on both the sides of the space 31 by the magnetic field of the magnetic inline filter 10 and the coolant is filtrated.

The filtrated coolant is supplied from the supply port 22 to a machining section of the grinder 101 (a contact position of a grindstone and a workpiece) via a coolant supply pipe 114. It is possible to always stably perform machining with a clean coolant. A flow switch 115 for detecting a flow rate of the coolant flowing through the coolant supply pipe 114 is attached halfway in the coolant supply pipe 114. The flow switch 115 detects a lower limit of the flow rate and displays an alarm on a screen of the not-shown operation panel of the grinder 101.

In the coolant collection box 103, a rectangular box-like mesh basket 116 having a mesh of predetermined filtration precision is placed. A coolant discharge pipe 117 for discharging the coolant discharged from the discharge port 23 to the mesh basket 116 is connected to the discharge port 23. When machining by the grinder 101 ends, the piston rod 62 of the fluid cylinder 61 is stretched to the bottom end. After the magnetism acting in the space 31 is eliminated, the solenoid of the switching valve 231 of the discharge port 23 is actuated to discharge the coolant discharged from the discharge port 23 to the mesh basket 116. The mesh basket 116 separates the chips from the coolant and accumulates the chips and feeds the coolant, from which the chips are separated, to the coolant collection box 103. The mesh basket 116 is removed from the coolant collection box 103 to periodically clean the chips accumulated in the mesh basket 116.

The coolant pump for chip draining 108 supplies the coolant in the coolant tank 102 to the grinder 101 and the coolant tank 102 not through the magnetic inline filter 10. A pressure gauge 119 and a manual switching valve 120 are attached halfway in a pipe 118 that connects the coolant pump for chip draining 108 and the grinder 101. A manual switching valve 122 is attached halfway in a pipe 121 that connects the coolant pump for chip draining 108 and the coolant tank 102. The coolant supplied from the coolant pump for chip draining 108 to the grinder 101 is supplied to a jig and a bed of the grinder 101, washes away chips from the jig and the bed, and discharges the chips to a chip conveyor.

The coolant supplied from the coolant pump for chip draining 108 to the coolant tank 102 is supplied to a pipe for chip draining 123 disposed in the vicinity of the bottom surface 106 of the coolant tank 102. The pipe for chip draining 123 is formed long in the up-down direction in FIG. 14. The chips are washed away to the left side in FIG. 13 (the side of the coolant pump for machining 107 and the coolant pump for chip draining 108) along the inclined surface of the bottom surface 106 by the coolant discharged from a plurality of holes opened in the pipe for chip draining 123. The coolant tank including the magnetic inline filter 10 in the third embodiment of the present invention does not include expendables such as a paper filter. Therefore, running costs are reduced.

Other Embodiments

The embodiments of the present invention are explained above. However, the present invention is not limited to the embodiment. It goes without saying that changes are possible within a range not departing from the object and the gist of the present invention. For example, the cylindrical body 3 is formed in the cylindrical shape. However, the cylindrical body 3 is not limited to the cylindrical shape and may be formed in a rectangular cylindrical shape. In that case, the inner circumferential surface side magnet 4 may be formed in a rectangular columnar shape. The outer circumferential surface side magnet 5 may be formed in two semi-rectangular columnar shapes convex to the outer side. The magnet retaining body 41 and the magnet retaining body 51 are made of the magnetic body such as structural steel. However, the magnet retaining body 41 and the magnet retaining body 51 may be made of a nonmagnetic body such as austenite-based stainless steel. In this case, the magnetic density of the space (the gap) 31 increases. However, the magnetism in the vicinity of the outer circumferential surface 12 of the inner pipe 1 and the inner circumferential surface 25 of the outer pipe 2 decreases.

In the embodiments, filters of nonwoven fabric and the like is not used. However, it goes without saying that the magnetic inline filter of the present invention may be used together with these publicly-known filters. By using the filters together with the magnetic inline filter of the present invention, it is possible to reduce an amount of use of the filters, which are expendables.

The invention claimed is:

1. A magnetic inline filter, comprising:
    a double pipe composed of an inner pipe and an outer pipe disposed coaxially with each other, the double pipe being a cylindrical body for draining waste water including foreign matters, which are magnetic bodies, to a space, which is a gap between the inner pipe and the outer pipe;
    an inner circumferential surface side magnet, disposed on an inner circumferential surface side of the inner pipe;
    an external circumferential surface side magnet, disposed on an outer circumferential surface side of the outer pipe; and
    a relative driving device, which is driving device for moving the inner circumferential surface side magnet and the outer circumferential surface side magnet in the axial direction to keep the inner circumferential surface side magnet and the outer circumferential surface side magnet away from the space so that the foreign matters, which are retained and magnetized in the space and on circumferential surfaces of the inner pipe and the outer pipe, are demagnetized and discharged to an outside of the space, wherein
    the inner circumferential surface side magnet and the outer circumferential surface side magnet are disposed to be opposed to each other at different polarities,
    an axial direction length of the inner pipe is formed at least twice as long as an axial direction length of the outer pipe,
    in the inner circumferential surface side magnet and the outer circumferential surface side magnet, a plurality of magnets are stacked in the axial direction and disposed along an axial direction length substantially the same as an axial direction length of the outer pipe,
    in the inner circumferential surface side magnet, the plurality of magnets are disposed at equal angle intervals over an entire circumference of an inner circumferential surface of the inner pipe, and
    in the outer circumferential surface side magnet, the plurality of magnets are disposed at equal angle intervals over an entire circumference of an outer circumferential surface of the outer pipe, and
    the relative driving device includes:
    a first guide rod that guides the movement of the inner circumferential surface side magnet in the axial direction;
    a second guide rod that guides the movement of the outer circumferential surface side magnet in the axial direction; and
    a coupling plate for coupling the inner circumferential surface side magnet and the outer circumferential surface side magnet and driving the inner circumferential surface side magnet and the outer circumferential surface side magnet in synchronization with each other.

2. The magnetic inline filter according to claim 1, further comprising:
    an introduction port that is formed in a vicinity of a lower end of the axial direction length of the outer pipe and introduces waste water into the space;
    a supply port that is formed in a vicinity of an upper end of the axial direction length of the outer pipe and supplies the waste water cleaned in the space to a machining section;
    a discharge port that is formed below the introduction port in the outer pipe and discharges the foreign matters accumulated in the space to the outside of the space; and
    a switching valve that causes the space and the discharge port to communicate with each other during the discharge of the foreign matters.

3. The magnetic inline filter according to claim 2, further comprising:
    a coolant tank in which the magnetic inline filter is attached to an upper surface of the coolant tank and a coolant supplied to a machine tool is collected;
    a coolant pump that is attached to an upper surface of the coolant tank and supplies the coolant in the coolant tank to the introduction port;
    a coolant supply pipe that supplies the coolant from the supply port to a machining section of the machine tool;
    a coolant discharge pipe that discharges the coolant discharged from the discharge port to a coolant collecting section of the coolant tank; and
    a collection container that is attached to the coolant collecting section and has a predetermined filtration function for separating chips from the coolant discharged from the coolant discharge pipe and accumulating the chips.

4. The magnetic inline filter according to claim 3, further comprising:
    an obstacle that is disposed in the space and used to reduce flow velocity of a part of a flow of the waste water.

5. The magnetic inline filter according to claim 3, wherein the relative driving device is a fluid driving device.

6. The magnetic inline filter according to claim 2, further comprising:

an obstacle that is disposed in the space and used to reduce flow velocity of a part of a flow of the waste water.

7. The magnetic inline filter according to claim 2, wherein the relative driving device is a fluid driving device.

8. The magnetic inline filter according to claim 3, further comprising:
an obstacle that is disposed in the space and used to reduce flow velocity of a part of a flow of the waste water.

9. The magnetic inline filter according to claim 3, wherein the relative driving device is a fluid driving device.

* * * * *